Patented Dec. 4, 1928.

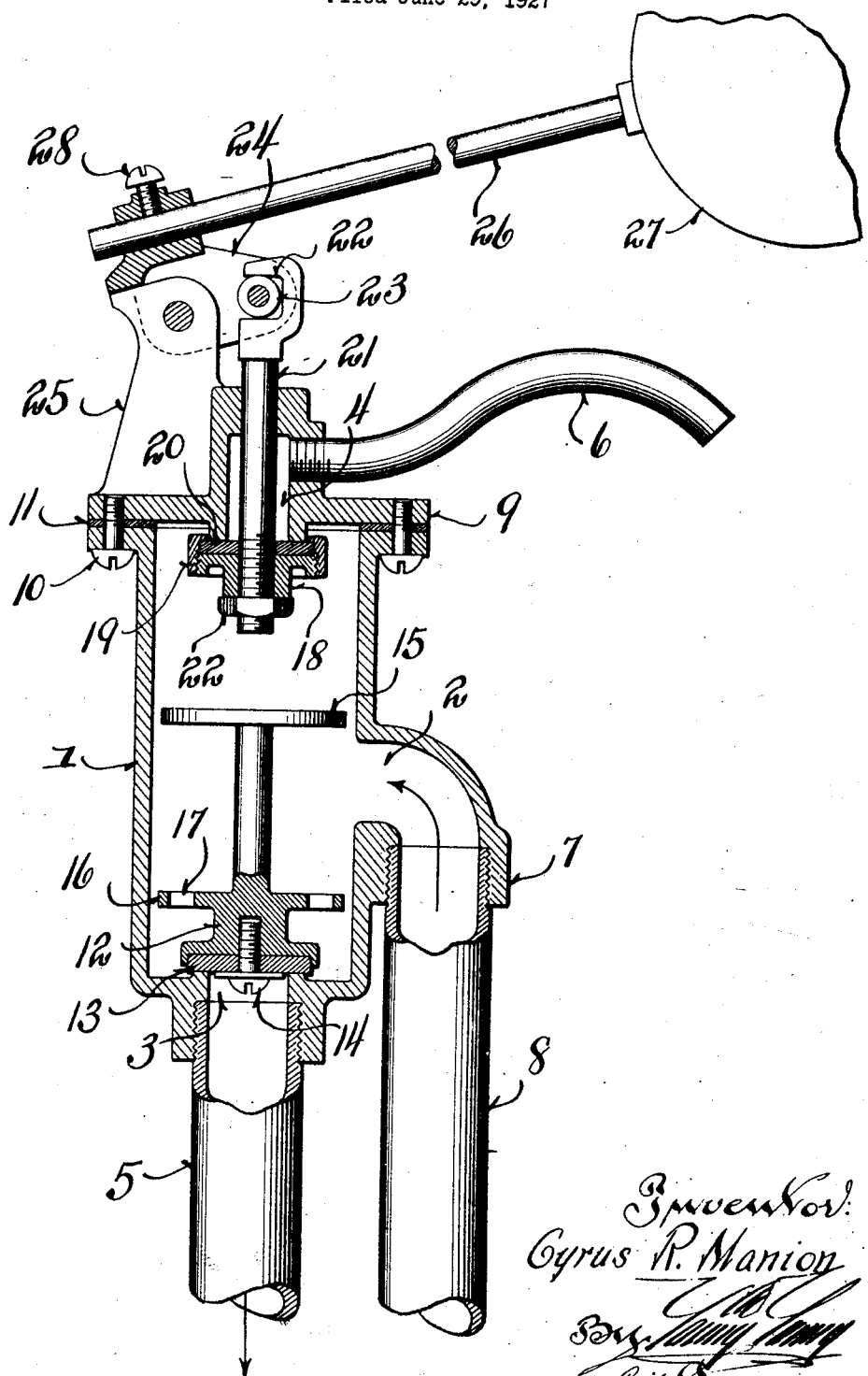

1,694,072

UNITED STATES PATENT OFFICE.

CYRUS R. MANION, OF MILWAUKEE, WISCONSIN.

FLUSH VALVE.

Application filed June 29, 1927. Serial No. 202,439.

This invention relates to valves, and although it is adapted for other uses, it is particularly directed to a flush tank valve.

Objects of this invention are to provide a novel form of valve which is quiet in operation and which cuts off the water quickly as distinguished from a gradual cutoff with constant wear on the valves, the present valve having scarcely any wear at the valve or valve seats.

A further object is to provide a very simple type of construction which may be actuated by means of a float to control the auxiliary valve, the main valve being automatically actuated and which is so constructed that a removable head is provided which carries the auxiliary valve and provides ready access to the main valve.

An embodiment of the invention is shown in the accompanying drawing, in which the single figure is a vertical sectional view through the valve.

Referring to the drawings it will be seen that the valve comprises a main casing 1 of cylindrical contour provided with an inlet opening 2 intermediate its ends and with a main outlet opening 3 at its lower end and an auxiliary outlet opening 4 at its upper end. The main outlet opening communicates with the discharge pipe 5, which in the form shown is used to fill the tank, and the auxiliary outlet opening communicates with the bowl refill pipe 6 which discharges into an overflow pipe (not shown).

Preferably the casing 1 is screwthreaded at its lower end for the reception of the pipe 5 and is provided with an enlargement 7 internally threaded for the reception of the supply pipe 8. The bowl refill pipe is screwed into the removable head 9 held in place by screws 10 and provided with a gasket 11.

The main valve is indicated generally by the reference character 12 and is provided with a rubber, or other washer, 13, held in place by a screw 14. This valve is provided with an upper piston 15 and with a lower piston 16, such pistons offering obstruction to the flow of water and the lower piston offering a lesser obstruction. This lower piston is preferably apertured, as indicated at 17, in order to secure this result, although obviously such result could be secured by other means.

The auxiliary valve consists of a body portion 18 provided with a ring nut 19, whose flange holds a rubber or other type of washer 20 in place upon the upper side of the body portion 18. This body portion receives the threaded lower end of the valve rod 21, a lock nut 22 being provided as shown in the drawing. The valve rod 21 passes through the head 9, as shown, and is preferably provided with a rectangular cutout portion 22 which receives the roller 23 of the small rocking lever 24. This rocking lever is pivoted upon the bracket 25 preferably integral with the head 9 and is provided with an aperture for the reception of the stem 26 of the float 27, such stem being locked in place by means of the set screw 28.

It is to be noted particularly that the main or upper piston 15 is located between the inlet opening and the auxiliary outlet opening. Thus when the valve rod 21 is depressed the auxiliary valve is open and water flows upwardly past the piston 15, thus elevating the main valve and causing a quick and full opening thereof. The water flows through the main outlet opening 3 into the tank until the float closes the auxiliary valve, which has previously been discharging into the bowl refill pipe 6. When the auxiliary valve closes, the force of the downwardly flowing water acting upon the piston 16 is not balanced by an upward pressure upon the piston 15. Consequently the main valve quickly closes and cuts off further flow of water. The main valve is thus quickly closed or quickly opened and the singing and humming noise usually present when the flush tank valves operate, is wholly absent with this valve. Further there is scarcely any wear upon the valve and valve seats where this invention is practiced, and it is to be noted further that the action of the valves is positive and certain.

Further it will be noted that the construction is extremely simple and strong and may be very readily produced.

Although the invention has been described in considerable detail, such description is intended as illustrative rather than limiting as the invention may be variously embodied and as the scope of such invention is to be determined as claimed.

I claim:—

1. A valve for a flush tank comprising a cylindrical casing having an inlet opening intermediate its ends and having a main outlet opening at its lower end and an auxiliary outlet opening at its upper end, a supply pipe communicating with said inlet opening; a discharge pipe communicating with said main outlet opening and a bowl refill pipe communicating with said auxiliary outlet opening, a main valve controlling the main outlet opening and having a pair of spaced pistons, the upper of which is located between the inlet opening and the auxiliary outlet opening, and the lower of which is located between the inlet opening and the main outlet opening, said lower piston offering less obstruction to the flow of water than said upper piston, an auxiliary valve for said auxiliary outlet opening and a float for controlling said auxiliary valve.

2. A valve for a flush tank comprising a cylindrical casing having an inlet opening intermediate its ends and having a main outlet opening at its lower end and an auxiliary outlet opening at its upper end, a supply pipe communicating with said inlet opening, a discharge pipe communicating with said main outlet opening and a bowl refill pipe communicating with said auxiliary outlet opening, a main valve controlling the main outlet opening and having a pair of spaced pistons, the upper of which is located between the inlet opening and the auxiliary outlet opening, the lower of which is located between the inlet opening and the main outlet opening, said lower piston offering less obstruction to the flow of water than said upper piston, and a float for controlling said auxiliary valve, the upper end of said casing being closed by a movable head carrying said auxiliary valve and said bowl refill pipe and float.

In testimony that I claim the foregoing I have hereunto set my hand at Milwaukee, in the county of Milwaukee and State of Wisconsin.

CYRUS R. MANION.